March 15, 1966  H. P. RAABE  3,241,142
GRAVITY STABILIZED SATELLITE
Filed Dec. 28, 1962  3 Sheets-Sheet 1

INVENTOR.
HERBERT P. RAABE
BY Stuart R. Peterson
ATTORNEY

March 15, 1966     H. P. RAABE     3,241,142
GRAVITY STABILIZED SATELLITE
Filed Dec. 28, 1962     3 Sheets-Sheet 2

INVENTOR.
HERBERT P. RAABE
BY
Stuart R. Peterson
ATTORNEY

United States Patent Office 3,241,142
Patented Mar. 15, 1966

3,241,142
GRAVITY STABILIZED SATELLITE
Herbert P. Raabe, St. Paul, Minn., assignor, by mesne assignments, to Litton Systems, Inc., Beverly Hills, Calif., a corporation of Maryland
Filed Dec. 28, 1962, Ser. No. 247,925
19 Claims. (Cl. 343—100)

This invention relates generally to satellites, and pertains more specifically to a satellite that will orient itself in a desired position when in orbit.

One object of the invention is to provide a satellite system that will be stabilized in a passive manner by the gradient of the field of acceleration due to gravity and centrifugal forces. Thus, it is intended to avoid any use of active devices, such as ion rockets, that would determine the lifetime of the satellite. A specific purpose of the invention is to provide a passive communication satellite that will have a reflective surface facing the earth at all times so that microwave energy originating on the earth can be received by other stations on the earth which would otherwise not receive this energy on a direct propagation path because of the earth's curvature.

Inasmuch as a satellite of the envisaged type may be deployed so that it assumes an arbitrary attitude in space, the satellite in this situation will librate about its desired stabilized position in a manner similar to a pendulum. Unfortunately, these librations will last indefinitely due to the lack of friction. Therefore, another object of the invention is to damp the librations so that the satellite reaches its gravity stabilized position in a relatively short period of time.

A further object is to provide a gravity stabilized satellite that can be launched and placed in orbit quite easily and stabilized after the auxiliary body has been deployed from its original proximal association with the main body.

Still another object is to provide a satellite of the foregoing character comprising two bodies or masses in which a predetermined amount of separation in space is achieved with but a minimum amount of deceleration force developing as the two bodies reach their fully separated state.

Yet another object of the invention is to produce a gravity stabilized satellite having an automatic damping action at all times, which satellite will not be costly to manufacture as far as its basic form is concerned, and the operating mechanism of which will not get out of order readily.

Quite briefly, the invention contemplates the use of two bodies having approximately equal masses. In orbit the two bodies are connected together by a relatively long wire and provision is made for initially paying out said wire from one of said bodies at a controlled rate so that only a small amount of deceleration force is involved during the paying out phase. To dampen any librations arising during the deployment and while traversing its orbital path, a device is carried by one of the bodies for absorbing the oscillatory energy, an eddy current brake being contemplated as one example of such a device.

These and other objects and advantages of the invention will more fully appear from the following description, made in connection with the accompanying drawing, wherein like reference characters refer to the same or similar parts throughout the several views and in which.

Figure 1:
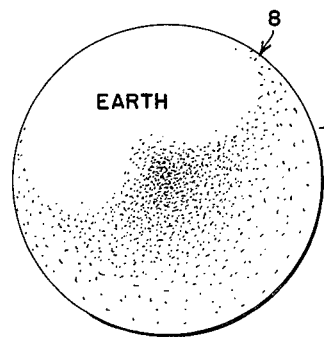
FIGURE 1 depicts a gravity stabilized satellite in a circular orbit around the earth.

Referring first to FIGURE 1, the earth has been denoted by the reference numeral 8 and the gravity stabilized satellite has been generally indicated by the reference numeral 10. The satellite, it will be understood, is to be considered as being in an orbit about the earth 8, although obviously other orbital radii might be selected at an orbital radius, depending upon the particular circumstances.

Figure 2:
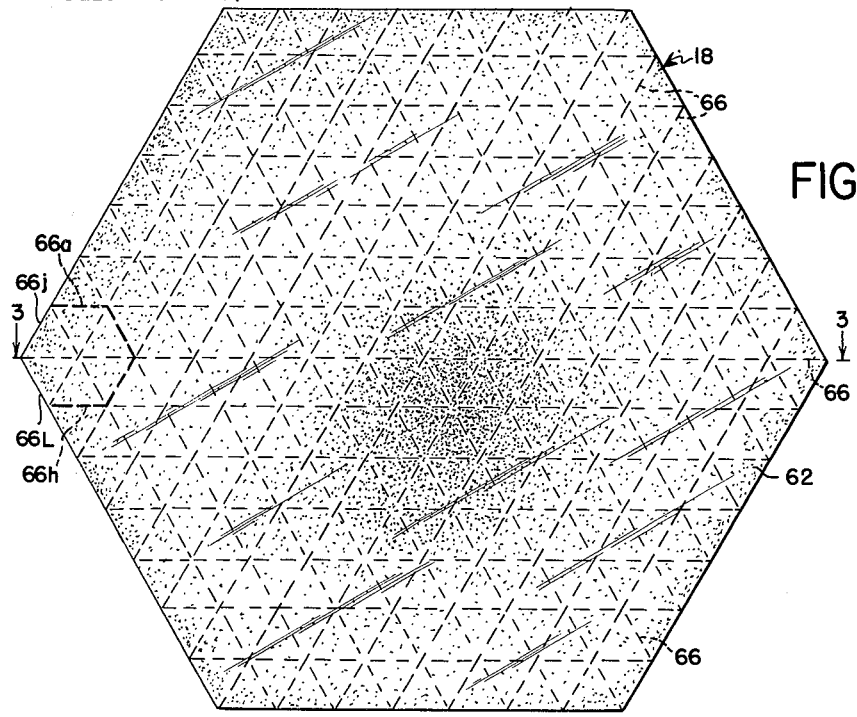
FIGURE 2 is a bottom plan view on an enlarged scale of the reflector shown in FIGURE 1.

The satellite 10 comprises an auxiliary body 12 in the form of a capsule from which extends a relatively long thin tethering wire, thin ribbon or thin cable 14 which may be several kilometers long. At the end of the wire 14 which is remote from the capsule 12 is a harness generally designated by the reference numeral 16 to which a main body 18 in the form of a reflector is connected. The reflector is quite sizable and as can be discerned from FIGURE 2 is in the form of a hexagon with a typical width between parallel sides of 115 m. (353 feet). The radius of curvature of the reflector 18 is on the order of 380 m. However, the specific size of the reflector 18 is susceptible to variation. A practical reflector construction will be presented hereinafter. At this point, though, it should be explained that the mass of the capsule 12 is substantially equal to the mass of the reflector 18. Thus, the two bodies 12 and 18 have approximately equal masses.

Before proceeding with a more detailed description of the capsule 12 and the reflector 18, it should be understood that any free orbiting satellite is in equilibrium with regard to two accelerations, the acceleration due to gravity.

$$g = g_0 \frac{r_0^2}{r^2} \qquad (1)$$

and the centrifugal acceleration $$c = \omega^2 r \qquad (2)$$

In these expressions $g_0$ = acceleration due to gravity on the surface of the earth,
$r_0$ = radius of the earth,
$r$ = radius of the orbit, and
$\omega$ = angular velocity of the satellite.

Thus the equilibrium means $$g = c \qquad (3)$$

or $$g_0 r_0^2 = \omega^2 r^3 \qquad (4)$$

If one would force a satellite to move at the same angular velocity along an orbit of slightly different radius $r + x$, equilibrium does no longer exist and a radial acceleration $$a = c - g \qquad (5)$$

must be applied to the satellite to keep it in this modified orbit. Hence $$a = \omega^2 (r + x) - g_0 \frac{r_0^2}{(r + x)^2} \qquad (6)$$

We can expand the second term in the following way $$g_0 \frac{r_0^2}{(r+x)^2} = g_0 \frac{r_0^2(r-x)^2}{(r+x)^2(r-x)^2} g_0 \frac{r_0^2(r-x)^2}{(r^2-x^2)^2} \quad (7)$$

If $x \ll r$, we can neglect $x^2$ in comparison with $r^2$ so that (6) becomes $$a = \omega^2 r + \omega^2 x - g_0 \frac{r_0^2}{r^2} + g_0 \frac{2r_0^2 x}{r^3} \quad (8)$$

Here we recognize that the first and third terms drop out because of the equilibrium $$a = \omega^2 x + g_0 \frac{2r_0^2 x}{r^3} \quad (9)$$

With the Expression 4 we obtain $$a = 3\omega^2 x \quad (10)$$

From the foregoing, it will be appreciated that an acceleration gradient field exists around the free orbit of the satellite 10. This means that a satellite of the envisaged type experiences radially stretching forces. Consequently, the tension of the wire 14 will vary as the satellite librates or swings in a pendulum-like fashion. If there is too much kinetic energy in the satellite system, the satellite will continue to oscillate, although the stabilizing force will exert a periodically varying decelerating and accelerating torque. In most situations, a swinging of even a few angular degrees cannot be tolerated.

One distinguishing attribute of the present invention resides in the fact that the two bodies 12 and 18 are separated by a considerably greater distance than heretofore attempted. In the case of beams, it can be recognized that appreciable difficulty enters into the situation because beams must of necessity be quite short. However, by using the wire 14, the distance between the bodies 12 and 18 can be quite large.

For instance, the capsule 12 and the reflector 18 may weigh 100 kg. each. If the center of gravity of the configuration is at the middle of the wire 14, $x$ in the previously presented Equation 10 would be 5 km. For the synchronous (24 hour orbit) satellite 10, under these circumstances, the angular velocity becomes $$\omega = 2\pi / d_s$$

whereby $$d_s = 86164.09$$

sec is the duration of a sidereal day.
Thus $$\omega = 7.2 \cdot 10^{-5} s^{-1}$$

and $$a = 8 \cdot 10^{-5} \text{ ms.}^{-2} = 8 \cdot 10^{-3} \text{ cms.}^{-2} \quad (11)$$

As this acceleration acts on a mass of $m = 100$ kg., this force amounts to $$f = m \cdot a = 10^5 \cdot 8 \cdot 10^{-3} = 800 \text{ dynes} \quad (12)$$

In comparison to the very small forces which might counteract this stabilizing force, such as radiation and meteoric pressure, this force is strong enough to maintain a stable attitude of the satellite 10, especially if one considers that the disturbing forces change their angle of attack. In other words, when stabilization has been achieved, the satellite 10 will assume the attitude shown in FIGURE 1 with the face of the reflector 18 directed toward the earth 8.

While FIGURE 1 illustrates a gravity stabilized satellite, which has been indicated by the reference numeral 10, in a circular orbit about the earth 8, there is a problem of deploying the reflector body 18, which is considered the main body, from the capsule or auxiliary body 12 in such a manner that librations will not result. While the librations can be minimized, the energy cannot be completely eliminated without using a damping device. Accordingly, the means utilized in the deploying of the reflector 18 from the capsule 12 will now be described. In this regard, attention is directed to FIGURE 7 where it will be seen that the capsule 12 is in the form of a spherical, hollow shell 20. The wire 14 in its unwound form extends through the shell 20 via an opening 21. It will also be observed that the wire 14 is guided through this opening by a pair of suitable rollers or pulleys 22. The wire 14, during launching of the satellite 10 and prior to deployment of the reflector 18, is stored on a winch 24 comprised of a reel 26 rotatable about its center. At this time, attention is called to a ball member fastened to the wire 14 adjacent the end thereof which is attached to the reel 26. The role played by the ball member 28 will be referred to later on.

For the purpose of paying out the wire 14 at a controlled rate is an electric motor 30 which is energized from a battery 32 through the agency of a timing switch 34. The time-operated switch 34 can be set to trigger its electrical contacts into a closed position when a sufficient period of time has elapsed to assure that the satellite 10 is then in orbit. It is also possible to employ a radio-operated switch, but a timing action is more simply realized. The motor 30, however, is a constant speed motor, and the reason for this will become manifest as the description progresses.

Whereas the reflector 18 is connected to the exterior end of the wire 14 through the medium of the harness 16, it will be appreciated that the reflector 18 must be maintained in a furled or folded condition until it is to be separated from the auxiliary body constituting the capsule 12. In order to accomplish this, although the means is susceptible to structural changes, a fusible element 38 is connected therein so that the opposite ends of the wires or cables 36 will become separated when the fusible elements 38 are melted by reason of power supplied from the battery 32 through the time-operated switch 34. It will be appreciated that this arrangement is selected for illustration largely because of its simplicity and ease of understanding. What the wires or cables 36 do is to retain a hollow spherical shell 40 comprised of two semi-spherical sections 42 in juxtaposition with respect to the spherical shell 20. Consequently, the guy wires 36 retain the shell 40, which serves as a package or container for the furled reflector 18, in proper relationship with the shell 20 by means of a plurality of leg units 44, these leg units 44 absorbing the pull exercised by the wires 36.

At this time, attention is drawn to the presence of a compressed coil spring 46 which is instrumental in pushing the two bodies away from each other when the fusible elements 38 are melted. The spring 46 is designed to impart the correct amount of velocity to the shell 40 and the reflector 18 contained therein when the reflector 18 is to be deployed. While a spring 46 has been shown, it will be appreciated that the two masses can be pushed apart in other ways, such as by jet action.

As will be better understood when considering a typical operational or deployment sequence, a suitable damping device for absorbing the energy due to deployment will now be described. This device has been generally designated by the reference numeral 48 and includes a small loop 50 encircling the wire 14, it being the intention to have the ball member 28 on the wire 14 engage the loop 50 when a predetermined amount of wire 14 has been payed out from the capsule 12. Attached to the loop 50 is an auxiliary wire 52 passing about a guide pulley 53 and then wound about a reel 54. The damping device 48 further includes an aluminum induction disc 56 rotatably carried by the reel 54 and having its periphery disposed so as to move with relation to a permanent magnet 58. It will be understood that the disc 56 and the magnet 58 constitute an eddy current brake.

Figure 3:
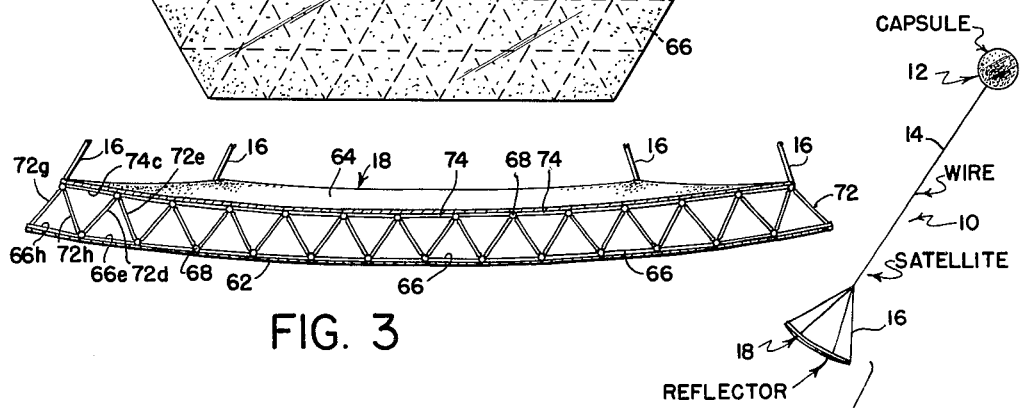
FIGURE 3 is a sectional view of the reflector taken in the direction of line 3—3 of FIGURE 2, the scale being still larger.

Although a detailed description of the reflector 18 would be quite voluminous, nonetheless, a brief description is perhaps in order, especially since the mass of the reflector should be held to a minimum. It will be recognized that a continuous curvature of the reflective surface requires either pressure loading as in a balloon or sufficient surface rigidity. Neither one is particularly desirable because of either short life or excessive weight. Thus, quite briefly, the reflector 18 involves the stretching of skin sections over a framework. More specifically, the reflector 18 includes a lower reflecting laminate structure 62 consisting of a one mil polyester film disposed between two sheets of ½ mil aluminum. Although not shown, the laminate structure will be of a perforated character involving a multiplicity of holes or apertures. Another laminate structure, identical to the laminate 62, is located at the top in FIGURE 3, this laminate having been assigned the reference numeral 64. It will be noted that a framework or latticework maintains the layers 62 and 64, which provide the reflective surfaces, in a spaced relation. Actually, as will become clearer when discussing the construction of the reflector 18, the structures 62, 64 will be preferably composed of triangular sheets of reflecting skin. The framework includes a plurality of tubular beams that can be erected by inflation. Each tube will be completely deflated and hermetically sealed with a sublimating substance enclosed therein before assembly of the satellite 10. In space, the tubes will individually be erected under the heat of solar radiation in absence of external pressure. After full erection, the gas will be released automatically but the framework will maintain its rigid shape. The framework generally includes a plurality of inflatable tubes which can be subdivided and suitably connected to each other, such as by snap mechanisms.

Figure 4:
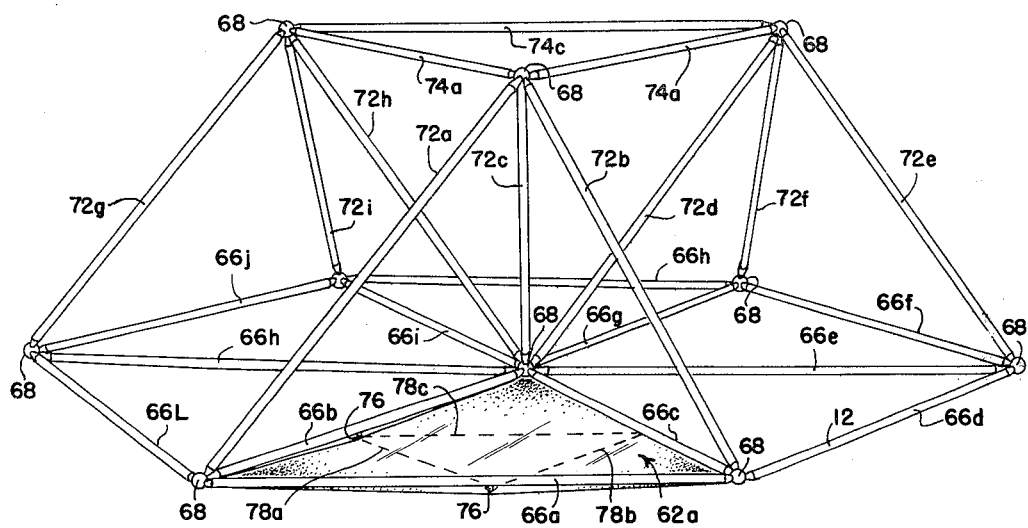
FIGURE 4 is a perspective view of a portion of the framework comprising the reflector.

As can be discerned from the arrangement illustrated in FIGURE 4, a plurality of inflatable laminated tubes 66a–66l, for example composed of a layer of aluminum and a layer of polyester material, are joined together to form a hexagonal segment of the base or bottom of the reflector's framework. To orient the reader, this particular hexagonal segment has been outlined in heavy lines in FIGURE 2. FIGURE 2 also indicates that numerous other tubes 66 are further joined together at their ends to complete the base of the framework.

Figure 5:
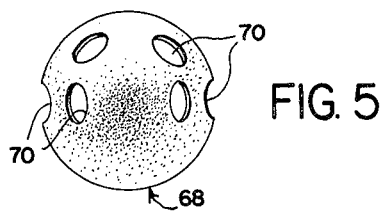
FIGURE 5 is a front elevational view of a spherical connector used to join the ends of the tubular beams appearing in FIGURE 4.

An appropriate connector for joining the ends of the tubular beams is shown to better advange in FIGURE 5. From this figure, it will be seen that the connector in the illustrated instance constitutes a spherical plastic shell 68 having a sufficient number, specifically nine, of apertures 70 therein for the accommodation of the ends of the various tubes, the inflation from the sublimating substance causing the received ends to become larger than the apertures 70 and thus retain the tubes 66 in place.

From FIGURE 4, it will also be noted that angularly disposed tubular beams 72a–72i incline upwardly from certain of the connectors 68. These last-mentioned tubes form three tetrahedrons with the previously referred to tubes. More specifically, the tubes 72a, 72b, 72c in conjunction with the tubes 66a, 66b, 66c form one tetrahedron; the tubes 72d, 72e, 72f form a second tetrahedron with the tubes 66e, 66f, 66g, and the tubes 72g, 72h, 72i form the third one in conjunction with the tubes 66h, 66i, 66j.

At the apices of the three tetrahedrons that have been described are placed three additional connectors 68 having apertures into which extend the ends of three tubular beams 74a, 74b and 74c. The beams are like the various beams 66 but are of shorter length in order to impart the desired curavture to the reflector 18.

From the information that has been given, it is believed that the over-all configuration of the framework to which the reflective skins or laminates 62, 64 are secured will be understood. A typical three dimensional truss design might include 462 tubular beams 66 at the lower level, 399 beams 74 at the upper level, and 441 beams 72 interconnecting or linking the upper and lower beams 66, 74. As already indicated, the beams 66, 72, 74 differ slightly and individually in length in order to generate the curved surface. This length might average 9.53 m. (29 ft.) though and have a diameter of from 10 to 15 cm. (4 to 6 inches).

Earlier, it was stated that the laminated film structures 62, 64 are preferably composed of triangular sheets or sections. One such sheet or skin has been labeled 62a in FIGURE 4, being stretched across the triangular spaced or oriented tubular beams 66a, 66b and 66c. However, the perforations formed in the section or piece 62a which greatly minimize the over-all weight of the reflector 18 have not been shown. Close inspection of FIGURE 4 will reveal the presence of small protuberances 76 which deflect slightly the section of skin 62a midway between the ends of the beams 66a, 66b, 66c. As indicated by the dotted lines 78a, 78b and 78c, the surface of the individual skin section 62a is thus divided into four smaller triangular reflecting facets rather than the single planar triangle that would otherwise exist. When this flexing is imparted to the multiplicity of sections constituting the complete reflective surface 62 (and also the complete surface 64), a better over-all reflective surface is formed which more nearly approaches a true spherical segment. Of course, a true spherical segment is not necessary, but a substantially spherical segment is, of course, desirable and for practical purposes the foregoing construction provides a highly satisfactory reflector 18. Stated somewhat differently, while one might be inclined to believe that a reflective surface should be shaped as precisely as the reflector of a large directional antenna for the same frequency, this is not necessary because for each communication channel only a small surface patch contributes to the echo. Therefore, accuracy requirements are restricted to any such small segment and cumulative errors over the entire surface are not harmful.

Figure 6:
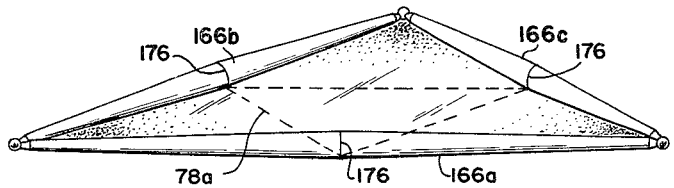
FIGURE 6 is a perspective view of a slightly modified reflector unit usable in the framework of FIGURE 4.

Instead of the protuberances 76, the cylindrical beams 66a, 66b and 66c can have a biconical configuration, as illustrated in FIGURE 6. The biconical beams there shown have been labeled 166a, 166b and 166c, respectively. The larger diameter at 176, that is, in the center of these beams, provides the same offsetting to form the various facets outlined by the dotted lines 78a, 78b, 78c, so that the same reference characters appear in FIGURE 6 as in FIGURE 5.

Figure 7:
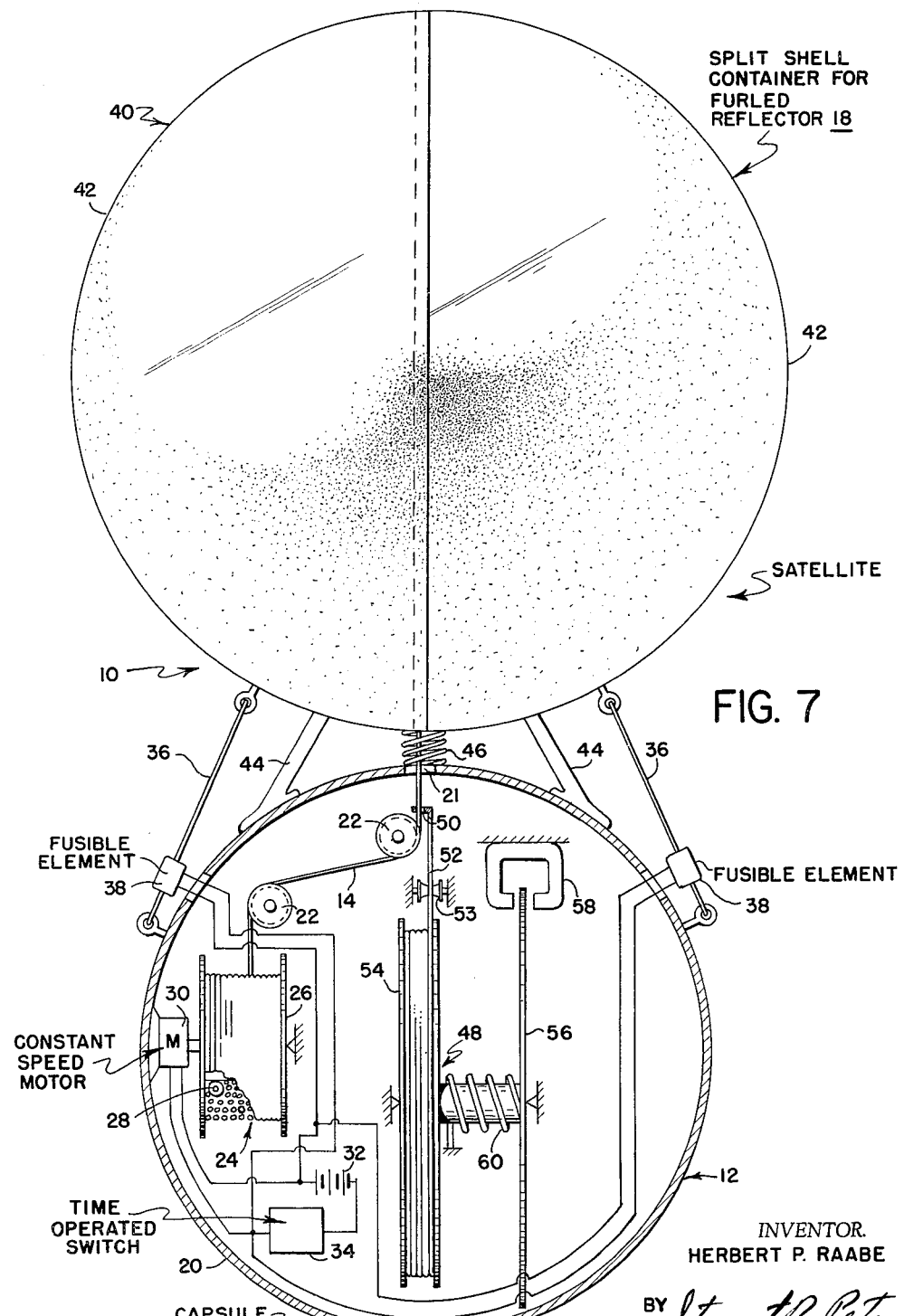
FIGURE 7 is a side elevational view of the satellite of FIGURE 1 before deployment of the reflector from the capsule, the capsule being shown in section in order to expose to view both a winch mechanism and a damping device housed therein.

Having presented the foregoing information, the manner in which the reflector 18 is deployed with respect to the capsule 12 should be readily understood. However, a brief description of what occurs will undoubtedly be of assistance in appreciating the benefits to be derived from a practicing of the instant invention. Thus, after the satellite 10 in its form shown in FIGURE 7 is placed in a desired orbit about the earth, a sufficient time having by then elapsed, the switch 34 is responsible for disengaging the split shell container 40 from the capsule 12. This occurs when the fusible elements 38 are melted from electric current supplied from the battery 32. As already indicated, other release mechanisms can be employed and would be probably used in preference to the fusible elements 38.

Concomitantly, with the melting of the fusible elements 38 is the energization of the motor 30 so that the wire 14 contained on the reel 26 will be payed out in a controlled manner. It will be recalled that the motor 30 has previously been referred to as operating at a constant speed. This is highly desirable, for as the wire 14 is payed from the reel 26, the diameter of the remaining wire on the reel 26 will gradually decrease. Thus, while the motor 30 operates at a constant rate, the rate at which the wire 14 is unwound is at a gradually decreasing rate. Hence, when the full amount of wire 14 is unwound, as pictured in FIGURE 1, any shock when the end of the wire 14 is reached is minimized.

It will be appreciated that the coil spring 46 is instrumental in initiating the deployment, for it provides a small amount of thrust which starts the shell 40 with the reflector 18 inside on a path away from the capsule 12. The speed of the motor 30 is commensurate with the need for paying out the wire 14 at the proper rate in conjunction with the impulse derived from the spring 46.

As soon as all of the wire 14 is payed out, the end of the wire to which the ball member 28 is attached engages the loop 50 so as to unwind the auxiliary wire 52 from the reel 54 on which it is stored. This is due to the kinetic energy resulting from the deployment operation. It will be appreciated that the energy is minimized by the controlled paying out of the wire 14, but still some energy remains that must be dissipated and it is the function of the damping device 48 to do this. Also, there would be librations developed during the orbiting that would prevent the satellite from performing numerous functions that require a stabilized condition, but these librations are effectively damped when employing the instant invention.

As the auxiliary wire 52 is pulled from the reel 54, there is produced an imposing force in the form of the action provided by the coil spring 60, this spring being wound up until the satellite masses come to a relative stop. It will be remembered that the librations are accompanied by variations of the stretching force in the wire 14. This force, as previously indicated, is caused by two major factors, one being the static contribution due to the difference of acceleration potential for the locations of the two masses and the second being from the dynamics of the masses. The static contribution is zero when the wire 14 is normal to the gravity vector and reaches a maximum when the wire is parallel to this vector, whereas the second contribution would be zero when the satellite reverses the direction of librating motion. The stored energy in the spring 60 resulting from these librations, however, will pull the wire 52 back on the reel 54 so that an oscillation will result within the damping device 48. Inasmuch as the disc 56 is coupled to the reel 54, such oscillations are transferred to the disc 56 and its juxtaposition with respect to the permanent magnet 58 will convert the energy thus provided into heat that can be readily dissipated. Thus, the terminal shock of the deployment, even though minimized to begin with, as well as the librations of the system during its orbiting will be absorbed.

In summation, the present invention employs a post-deployment stabilization. While the satellite 10 is swinging in a pendulum-like fashion, the centrifugal acceleration will in certain portions of the swing decrease and the effect of the gravitational acceleration means more pull in the wire 14. During a reverse swing, the tension in the wire will diminish and can even go through zero. It is this variable wire tension that is used to actuate the damping device 48 so as to reduce at a relatively fast rate the undesired satellite librations, the coil spring 60 yielding under the tension of the wire 14 by reason of its connection to the auxiliary wire 52 to cause the loss of energy due to friction between the disc 56 and the magnet 58.

Hence, when equipped with the damping device 48, the satellite 10 can be deployed at any attitude which might result in a tumbling action, inasmuch as the energy of the tumbling action is damped by the device 48. The tumbling energy should, however, be kept within reasonable limits and it is the office of the winch 24 to see to it that the reflector 18 when in the shell 40 is payed out at a rate that will minimize the tumbling energy when the entire wire 14 has been unwound. Thus, within a limited amount of time, the satellite 10 will settle down to its useful orientation as shown in FIGURE 1. This is also true of subsequent librations that would otherwise occur.

Although the mechanism therefor is not pictured in FIGURE 4, it is planned that the semi-spherical shells 42 be thrust apart in order to release the reflector 18 contained therein. This can be done by firing a suitable squib or other unlatching mechanism that will permit separation of the halves 42.

It is possible that the satellite 10 may be oriented in a position 180 degrees opposite to that shown in FIGURE 1. However, one does not have to be concerned about the particular position of the satellite 10, as its position can be reversed. All that is necessary is that a second reflective skin be provided, and this has been incorporated into the reflector 18, it being in the form of the second laminate 64. It will be recognized that the reflection characteristic of a small convex spherical segment is the same as that of a small concave segment, the focal point being on one side of the reflector or the other when the curvature is reversed.

It will, of course, be understood that various changes may be made in the form, details, arrangements and proportions of the parts without departing from the scope of my invention as set forth in the appended claims.

What is claimed is:
1. A gravity stabilized satellite comprising:
   means providing a first body;
   means providing a second body spaced from said first means; and
   an elongated wire element connected to each of said bodies and extending therebetween.
2. A gravity stabilized satellite in accordance with claim 1 in which:
   the masses of said bodies are substantially equal to each other.
3. A gravity stabilized satellite comprising:
   a first body member;
   a second body member;
   an elongated ribbon connected to said first body member; and
   means carried by said second body member for paying out said ribbon to provide a preferred spacing between said body members.
4. A gravity stabilized satellite in accordance with claim 3 including:
   means for initially pushing said body members apart.
5. A gravity stabilized satellite comprising:
   a capsule having an opening;
   a reel rotatably mounted within said capsule;
   a supply of wire wound on said reel, said supply of wire including a free end passing through said opening;
   a main member attached to the free end of said wire; and
   means for paying out said wire from said reel to effect a preferred spacing of said main member with respect to said capsule.
6. A gravity stabilized satellite in accordance with claim 5 in which said paying means includes:
   a motor for paying out said wire at a controlled rate.
7. A gravity-stabilized satellite in accordance with claim 6 in which:
   said motor operates at a constant speed so that said main member moves away from said capsule at a decelerating rate as said wire is payed out from said reel.
8. A gravity stabilized satellite in accordance with claim 5 including:
   means for providing an initial thrust between said capsule and main member to push said main member away from said capsule.
9. A gravity stabilized system in accordance with claim 8 including:
   means actuated by said wire for damping oscillatory motion of said capsule and said main member after said preferred spacing has been reached.
10. A gravity stabilized satellite comprising:
    a capsule having an opening therein;
    a reel rotatably mounted within said capsule;
    a tethering wire wound on said reel;
    motor means coupled to said reel for paying out said wire through said opening from said reel;

an electromagnetically reflective member attached to said wire;

means for imparting relative movement of said member away from said capsule; and means for damping the librations of said capsule and said member after a preferred amount of wire has been payed out from said reel.

11. A gravity stabilized satellite in accordance with claim 10 in which said damping means includes:

a second reel rotatably mounted within said capsule;

an auxiliary wire wound on said second reel;

means for effecting engagement of said tethering wire with said auxiliary wire when a desired amount of said tethering wire has been payed out;

a coil spring opposing rotation of said second reel for storing oscillatory energy imparted to said auxiliary wire due to said librations; and a device coupled to said second reel for converting said oscillatory energy to heat.

12. A gravity stabilized satellite in accordance with claim 11 in which said device includes:

a permanent magnet; and an induction disc coupled to said second reel.

13. A gravity stabilized satellite comprising:

a capsule;

a relatively long wire extending from said capsule; and an electromagnetic reflector attached to the end of said wire remote from said capsule.

14. A gravity stabilized satellite in accordance with claim 13 in which said reflector includes:

spaced layers of reflective material.

15. A gravity stabilized satellite in accordance with claim 14 in which said reflector includes:

a plurality of inflatable tubes providing the spacing means for said layers.

16. A gravity stabilized satellite in accordance with claim 15 in which said reflector includes:

a plurality of spherical connector elements having apertures into which the ends of said tubes project.

17. A gravity stabilized satellite comprising:

a first body member;

a second body member;

an elongated ribbon connected to said first body member;

deploying means for urging said first and second body members apart at an initial velocity; and means for paying out said ribbon from said second body member at a selected rate so that said first and second body members move apart at a variable velocity which successively decreases from said initial velocity.

18. A gravity stabilized satellite in accordance with claim 17, including:

means rendered effective upon movement of said first and second body members apart into a predetermined space relationship for damping said movement of said first and second body members at said variable velocity.

19. A gravity stabilized satellite in accordance with claim 18 in which said damping means includes:

an auxiliary ribbon engaged by said elongated ribbon upon occurrence of said predetermined space relationship; and an eddy current brake actuated by said auxiliary ribbon for damping said movement of said first and second body members at said variable velocity.

References Cited by the Examiner

UNITED STATES PATENTS 2,187,575  1/1940  Schroder _____ 343—707 X
2,521,737  9/1950  McKee et al. _____ 343—707 X

OTHER REFERENCES

Klemperer and Baker: Satellite Librations, in Astronautica Acta, vol. III, fasc. 1, 1957.

Paraballoon Antennas (La Fonde), Missiles and Rockets, Jan. 11, 1960, pages 21–25 relied on.

CHESTER L. JUSTUS, *Primary Examiner.*

UNITED STATES PATENT OFFICE
CERTIFICATE OF CORRECTION

Patent No. 3,241,142                                March 15, 1966

Herbert P. Raabe

It is hereby certified that error appears in the above numbered patent requiring correction and that the said Letters Patent should read as corrected below.

Column 3, lines 2 to 4, the equation should appear as shown below instead of as in the patent:

$$g_0 \frac{r_0^2}{(r+x)^2} = g_0 \frac{r_0^2(r-x)^2}{(r+x)^2(r-x)^2} = g_0 \frac{r_0^2(r-x)^2}{(r^2-x^2)^2}$$

column 3, line 50, the equation should appear as shown below instead of as in the patent:

$$\omega = 7.3 \cdot 10^{-5} s^{-1}$$

column 8, line 57, for "declerating" read -- decelerating --.

Signed and sealed this 26th day of September 1967.

(SEAL)
Attest:

ERNEST W. SWIDER                          EDWARD J. BRENNER
Attesting Officer                       Commissioner of Patents